April 28, 1925.
W. L. MORRIS
1,535,240
CONTROLLER FOR FUEL IGNITERS
Filed Sept. 11, 1922
3 Sheets-Sheet 2
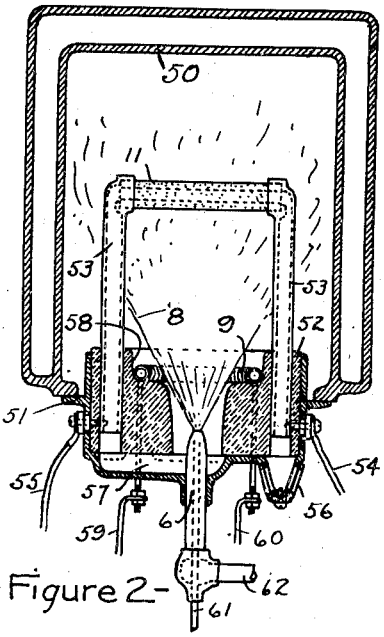
-Figure 2-
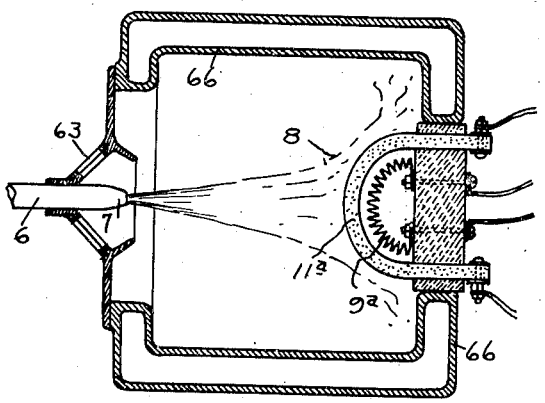
-Figure 3-
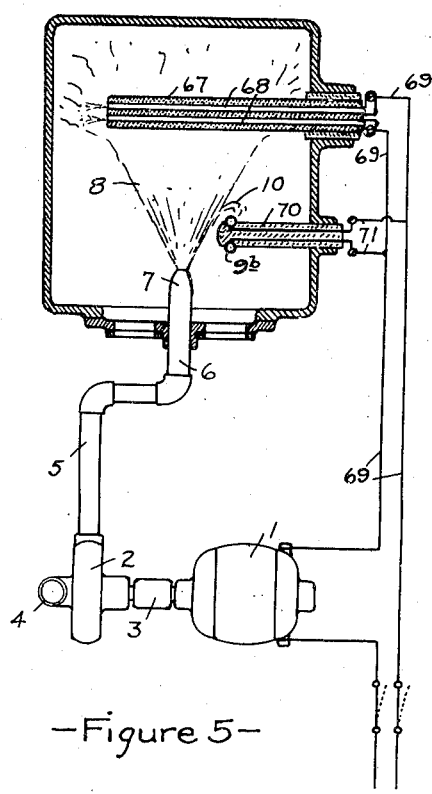
-Figure 5-
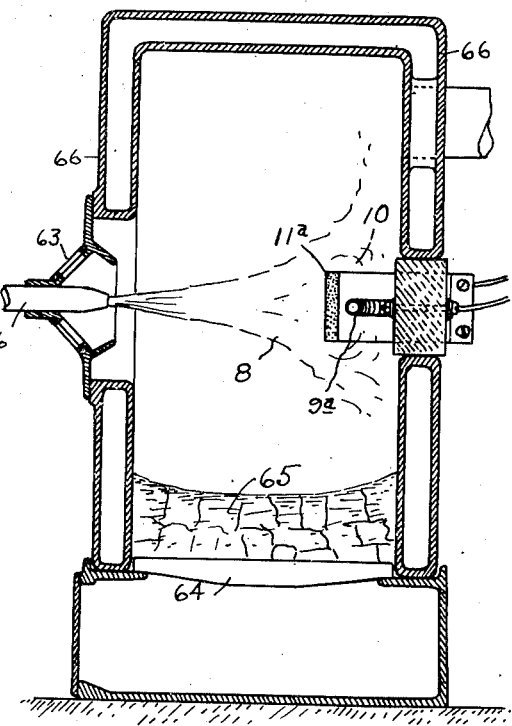
-Figure 4-
William L. Morris
INVENTOR.
BY Kent W. Wounsell
ATTORNEY.

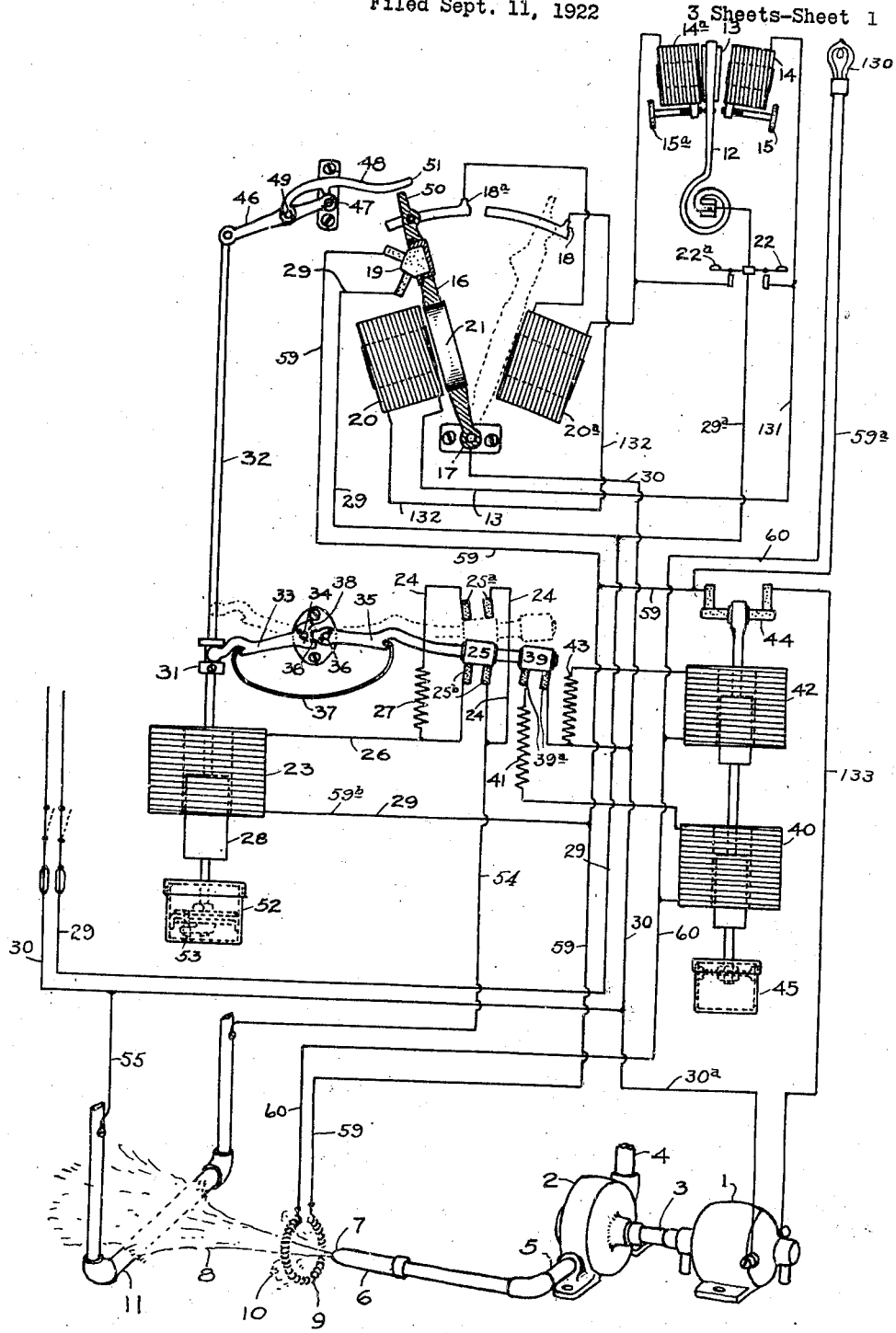
April 28, 1925.
W. L. MORRIS
1,535,240
CONTROLLER FOR FUEL IGNITERS
Filed Sept. 11, 1922  3 Sheets-Sheet 1
—Figure 1—
—Inventor—
William L. Morris
By Kent W. Wonnell —Atty—

April 28, 1925.
W. L. MORRIS
1,535,240
CONTROLLER FOR FUEL IGNITERS
Filed Sept. 11, 1922    3 Sheets-Sheet 3
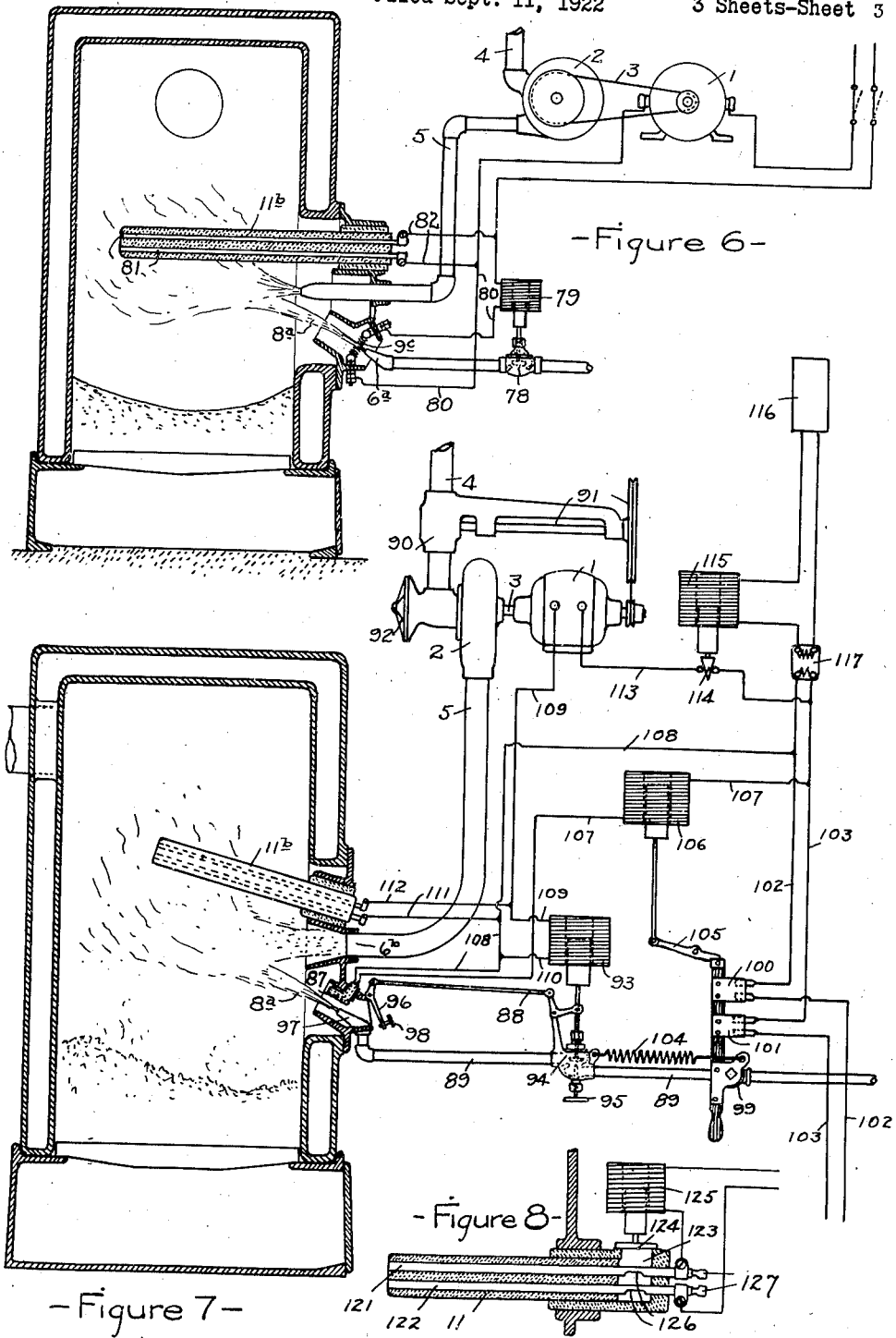

Patented Apr. 28, 1925.

1,535,240

UNITED STATES PATENT OFFICE.

WILLIAM L. MORRIS, OF CHICAGO, ILLINOIS, ASSIGNOR TO ELECTROIL SYNDICATE, AN ASSOCIATION COMPOSED OF C. P. JAEGER, L. M. RUTLEDGE, WILLIAM L. MORRIS, AND WILLIAM K. BOOTH.

CONTROLLER FOR FUEL IGNITERS.

Application filed September 11, 1922. Serial No. 587,385.

*To all whom it may concern:*

Be it known that I, WILLIAM L. MORRIS, a citizen of the United States, residing at Chicago, in the county of Cook and State of Illinois, have invented certain new and useful Improvements in a Controller for Fuel Igniters, of which the following is a specification.

This invention relates to an apparatus and the method for igniting and controlling the ignition device of a furnace for a fluid, liquid, or granulated fuel, the fuel ordinarily being oil, oil and air, gas, gas and air, granulated fuel, and granulated fuel and air. In this application the means for delivering the fuel is an electric motor. Among the objects of the invention are: controlling the delivery of the fuel; to ignite the fuel electrically; to shut off the igniter when the fuel is burning; and to reignite it if the fuel is not burning. Other safeguards are provided so that if the igniter burns out no fuel will be admitted; if the system is restarted too soon for the ignition devices to function properly, no fuel will be delivered until it does; and the provision of means to automatically make and break electrical connections causing the system to function dependent upon the condition produced by the heat from the fuel. This latter is in the nature of a thermostat the function of which is to prevent current from being delivered to the motor for supplying the fuel until the igniter is operated. Other objects will appear hereinafter.

In the accompanying drawings, Fig. 1 shows diagrammatically an entire system constructed in accordance with the principles of this invention controlled by a thermostat, delivering fuel which is ignited by an electric igniter; Fig. 2 is a plan view of one form of igniter; Figs. 3 and 4 are plan and vertical sections of a protected igniter; Fig. 5 shows a hand controlled igniter system; Fig. 6 illustrates an electrically ignited gas lighter; Fig. 7 shows an electrically controlled gas pilot light; and Fig. 8 shows a tube cooling control.

In the forms illustrated there is an electric driving motor 1, a pump fan or blower 2, and a connecting means 3. Fuel enters the pump through a connection 4 with a discharge 5 which leads to a burner 6 with a discharge nozzle 7. When ignited, the flame 8 flares outwardly, passing by the igniter 9, but sufficiently close thereto so that the eddying currents 10 of the main flow of fuel before being ignited will come in contact with the igniter to ignite the fuel. Having the igniter out of the direct path of the fuel is a very important consideration, as it permits using an igniter at a much lower temperature, thereby insuring a much longer life.

An electrical resistance member 11 is placed directly in the flame 8 or adjacent thereto and is of suitable refractory material such that a temperature variation will so change its electrical conductivity that the change will control the operation of the mechanism. Briefly speaking, the operation is to heat the igniter 9 by turning on the current to start the motor 1 for delivering fuel, and to ignite the fuel with the igniter; and then as the resistance member 11 becomes heated to utilize this change for reducing the current through the igniter 9 so that it is no longer incandescent.

In Fig. 2 the burner is applied to a water heater 50 with a door 51 having a lining 52 of high electrical resistance. Metal tubes 53 mounted in the lining support the hollow resistance member 11 with insulated conductors 54 and 55 connected through the door to the ends of the tubes. Air is admitted to the tubes and resistance through a register 56 and drawn into the furnace around the burner 6 through a port 57. The coil 9 is seated in a recess 58 out of the path of the flame 8 when the fuel is ignited, but in the path of any stray or eddy currents for igniting the fuel. Conductors 59 and 60 insulated from the door and connected to the ends of the coil 9. The burner shown in Fig. 2 is one ordinarily used for oil, a connection 61 being for oil and the pipe 62 being for air.

As shown in Figs. 3 and 4, additional air may be drawn into the furnace through a register 63 or through bottom grates 64 and loose material 65 of a water heater 66. The refractory material 11ᵃ in these figures extends over and partially protects the igniter coil 9ᵃ so that the coil is not in the direct path of the flame, but is in the path of the eddy currents 10 whereby the fuel will be ignited by the igniter coil 9$^a$ and the coil will be protected by the refractory resistance 11$^a$ after the fuel is ignited.

In Fig. 5 is shown a simple hand controlled system, except for the igniter which receives current when the flame 8 is extinguished, and gradually becomes colder from an electrical standpoint after the fuel is burning. An electrical resistance member 67 is of large current capacity when heated so that the motor 1 can run at approximately full speed. Metal tubes 68 to which conductors 69 are attached allow air to pass through so that they will not be injured by the heat and they lie close together in the material 67 so that the resistance between them is reduced when the member 67 is hot.

An igniter coil 9$^b$ is carried by the tube 70 close to the burner 6 and in the path of the eddy currents 10, the igniter being connected by the conductors 71 in parallel with conductors 68 of the resistance member 67. Before the fuel is ignited the resistance member 67 is cold and of high resistance and most of the motor current flows through coil 9$^b$, but after it becomes heated, its conductivity is so increased that most of the current passing through the motor will be shunted through the conductors 68 allowing only a small portion of the current to flow through the igniter coil 9$^b$, and as it is out of the path of the flame from the burner, it will not be directly heated thereby.

In Fig. 6 an electrically ignited gas lighter is shown, the resistance tube 11$^b$ being practically out of the path of a small gas flame 8$^a$ which is delivered by a small gas burner tip 6$^a$ ignited by an auxiliary igniter coil 9$^c$. A valve 78 in a gas supply line is opened by means of a solenoid 79, and the latter and the igniter 9$^c$ and connected in series by conductors 80, and in parallel with conductor tubes 81 in the resistance member 11$^b$ by conductors 82. Igniter 9$^c$ can be much smaller and more delicate if it ignites only the easily lighted cleain gas admitted through the valve 78. The heavy oil and granulated fuels are more readily lighted by a secondary lighting system, as illustrated in this figure. As the resistance 11$^b$ becomes heated, the current through the solenoid 79 and through the coil 9$^c$ in series therewith is decreased which lowers the temperature of the coil and allows the gas line valve 79 to close.

The resistance members 11 may be made of certain forms of carborundum which have extremely high resistance up to about 500° F., but when the temperature rises to about 1500° F., the resistance is very small. In starting the motor when the furnace is cold practically no current will pass through the carborundum resistance 11. But this would only continue until the fuel is ignited heating up the resistance member 11, the resistance of the member 11 then decreasing, and the igniter 9 connected in parallel therewith taking less current and gradually lowering in temperature until almost no current passes through it. If the flames should go out the resistance of the member 11 quickly increases as it cools off, the igniter receives more current and continues to rise in temperature until the fuel is again ignited. Not only is current saved by this procedure, but the life of the igniter 9 is greatly prolonged, and the action is entirely automatic.

Fig. 7 shows a construction for burning and controlling pulverized fuel. In connection with the motor 1 is a fuel measuring device 90 and its driving mechanism 91, with an air register 92 for the fuel feeder. In the furnace is a resistance member 11$^b$ above the fuel inlet 6$^b$ while below it is a gas pilot burner 97 and a smaller resistance member 87. This burner is at the end of a supply pipe 89 in which is a valve 94 having a pilot adjusting screw 95, the valve being operated by a solenoid 93, the cord of which also has a connection 88 for operating an air damper for the pilot burner 97, with an adjusting screw 98 on the damper to set the amount of air for the burning of a small amount of air. Another valve 99 in the gas pilot light. Another valve 99 in the gas supply line 89 has an arm carrying contact 100 and 101 for making and breaking electrical connections with the supply mains 102 and 103. A spring 104 tends to open this valve 99, and a trigger lever 105 controlled by a solenoid 106 tends to keep it closed. The winding of this solenoid 106 is connected in series with the smaller electrical resistance 87 and to the mains 102 and 103, by conductors 107 and 108. The winding of solenoid 93 is connected in parallel with the resistance device 11$^b$ by conductors 109, 110, 108, 111, 112 and in series with the motor 1 by conductors 108, 109 and 113 to the mains 102 and 103 through a main switch 114 operated by a solenoid 115 controlled from a thermostat 116 using, if desired, current from a transformer 117.

In the operation of the system shown in Fig. 7, the gas pilot light runs very low when fuel is burning, or when the thermostat 116 has stopped the fuel feeding motor, and an igniting flame burns only when the circuit is closed and the fuel feeding motor is running. The valve 99 is closed by hand and the trigger lever 105 maintains it in this position as long as the circuit traced above through the solenoid winding 106 and the resistance device 87 is unbroken. If it becomes broken the core of the solenoid falls tripping the lever 105 and releasing the arm of valve 99 for operation by the spring 104. The solenoid winding 93 and the resistance device 11$^b$ are connected in parallel, and, as previously explained, the heating up of the resistance member 11ᵇ will cut out part of the current through the solenoid winding allowing the pilot valve 94 to be closed, thereby turning down the pilot light flame 8ª and closing the air damper 96.

The preferred construction of the refractory resistance members is shown in Fig. 8 and comprises conductor tubes 121 and 122 which permit air to pass therethrough to the inside of the furnace for aiding the combustion of fuel, serving to prevent injury by excessive heat to the conductors themselves, and quickening the action of the resistance member when the fire is out by cooling the resistance. To prevent cooling when the fuel is just ignited which delays the operation of this variable resistance, the air passages are kept closed and are opened only when the resistance member 11 has sufficient conductivity to permit operation of the control of the igniter. At a distance from the outer ends of the device is an opening 123 which is closed by a valve 124 controlled by a solenoid 125 connected in series with the conductor tubes. This device is to take the place of the resistance 11, shown in Fig. 1, the solenoid 25 and the conductor tubes being connected in series with conductors 54 and 55. Communicating with the recess 123 are openings 126 in the sides of the tubes permitting air to enter and at the ends of the tubes are plugs 127 for closing them but to permit inspection and cleaning out when the plugs are removed.

While the constructions above described are designed and intended to meet certain conditions in operation, the preferred system is shown in Fig. 1 which is especially adapted to a large current flow through the igniter 9 so that ignition is positive and instantaneous. In this the arrangement is a primary controller, a main switch 21, a switch lever 35 and a number of controlling coils or solenoids.

The primary controller is a thermostat or pressure controller comprising a member 12 which is movable back and forth due to the unequal expansion of two connecting materials. The outer moving end of this member carries an iron block 13 which is attracted to either one of the holding coils 14 or 14ª when contact is made with their corresponding temperature adjusting screws 15 or 15ª which form contact terminals for their respective coils. The purpose of these coils is to hold the member 12 firmly against the corresponding contact as soon as the slightest touch is made by the member 12 with either contact, as a circuit is then made through its holding coil, and the member 12 is held in contact until the main switch 21 is thrown which breaks the circuit completed through the adjusting screw contact 15 or 15ª.

The main switch 21 comprises an arm 16 having a fixed pivot at its lower end 17 connected with one of the conductor mains 30. The outer end of the arm connects and makes electrical connection with contacts 18 or 18ª which are respectively connected to opposite windings 20 and 20ª for attracting an armature carried by the switch arm to move it in either one of two limiting positions. In one position the arm makes connection with the contact 18ª and by means of an insulated contact 19 carried by the arm it closes a connection in this limiting position between main conductors 59 and 29, for controlling the ignition device and the motor.

A motor switch 44 is controlled by a rod on which are the cores of two solenoids 40 and 42 with a dash pot device 45 at the end for retarding the movement of the rod. One of the solenoids 42 is connected in series with a resistance 43 and the other solenoid 40 is connected in series with a resistance 41 and to a switch 39 in parallel with the other winding 42 and its resistance 43. When the switch 39 is open it breaks the circuit through the winding 40 but not through the other winding 42.

To operate the switch 39 there is a switch lever 35 pivoted at 36 and operated by a lever 33. Pivoted at 34 and connected with the other lever by a stiff spring 37 with engaging kick-off shoulders 38 so that the spring 37 will cause the lever 35 to snap quickly from one position to the other depending upon the movement of the lever 33. This lever is controlled by a solenoid 23 having a core 28 with an extending rod 32 and a collar 31 thereon for engaging the free end of the lever 33. At the lower end of the rod 32 is a dash pot device for a time regulating screw 53. A switch contact 25 carried by the switch lever 35 is adapted to make connection between the contacts 25ᵇ in one position and the contact 25ª in the other position for cutting in the resistance 27 in circuit with the resistance member 11 through the coil 23. While the resistance 11 is at comparatively low temperature its resistance is very high, and to enable cutting out the igniter soon after lighting the fuel, it is necessary that coil 23 operates under slight current flow. As the resistance member 11 increases in heat it also increases in conductivity, and in order to save this coil 23 it is necessary to cut in the resistance 27 which is approximately equal to the resistance of the member 11 at the time the iron core 28 is attracted by the solenoid 23, as all the remaining resistance of the member 11 will disappear when it reaches its maximum temperature in the flame.

At the upper end of the lifter rod 32 a lever 46 is pivoted adjacent the upper end of the switch 16. A latch lever 48 is pivoted on this lever 46 at a point 49 intermediate the ends and the intermediate portion of the lever 48 rests on the pivoted end 47 of the lever 46 so that the free end 51 will project over member 50, when the rod 32 on the lever 46 are raised into the path of the end 50 of the switch 15. When this rod 32 is in its raised position due to the resistance 11 being hot the switch 16 can be opened but cannot be closed immediately after opening it or until the dash pot device 52 has allowed the core 28 and the rod 32 to drop sufficiently so that the end 51 of the lever 48 will clear the projecting end 50 of the switch 16. This dash pot device is provided with a time regulating screw 53 so that the switch 16 cannot be closed before the resistance 11 has cooled down increasing its resistance an appreciable amount. This dash pot device preferably has a cup leather piston which permits a quick up movement of the rod 32 in cutting out the igniter 9.

A signal lamp 130 is connected to the terminals of the igniter 9 by means of conductors 60, 59, 59ª, for indicating the condition of the system. When the igniter is hot with the switch 39 closed the voltage drop across the igniter will be low and the lamp will be dimly lighter or show only a red filament; when the switch 39 is open when the igniter is off, the lamp 130 will show full brightness; when the lamp is out, the system will be out of service, and if the lamp does not light up upon pressing the push button 22ª, will indicate that the lighter 9 is burnt out. A bright light indicates that the system is in operation with the igniter off. A dull light indicates that the system is starting up with the igniter on.

When the main switch is in the broken line position, as shown in Fig. 1, the entire system is shut off neither the motor nor the igniter receiving any current. As soon, however, as the member 12 engages the contact screw 15, or the push button 22 is manually operated, a circuit is closed from the main 29 through conductor 29ª and then either through the member 12 and the winding 14 or through the switch 22 to the conductor 131, coil 20, conductor 132, main switch contact 18, main switch 16, back to the other supply main 30. This causes the main switch 21 to be swung over to the full line position, as shown in Fig. 1, because of the attraction of the magnet winding 20 for the armature block 21. When the main switch swings over from the contact 18 to the contact 18ª the circuit just traced including the magnet winding 20 and 14 is broken and cannot be re-established until the main switch is swung back to the broken line position by the attraction of the other magnet winding 20ª. The switch lever 35 is normally in the lower position, as shown in Fig. 1, with the contact blocks 25 and 39 in engagement with their respective contacts.

As soon as the main switch block 19 makes connection with its contacts, a circuit is closed from the main 29 through the contact block 19 and conductor 59 through igniter 9 and thence by way of conductor 60 to the coils 40 and 42 in parallel. In series with the coil 42 is a resistance 43 and in series with the coil 40 is a resistance 41, the latter branch of the circuit including also the switch contacts 39ª which are closed by the contact block 39, both of the branch circuits being connected to the other main 30. The heavy flow of current is through the coil 40, resistance 41 and switch block 39. The other coil 42 and its resistance 43 have a small amount of current flowing through them as long as the main switch 16 is in the closed position. This current is necessary to keep the motor switch 44 closed. As soon as the motor switch 44 is closed a circuit is established through the motor from the main 30 through conductor 30ª, motor 1, conductor 133, motor switch 44, conductor 59, switch contact 19, back to main 29. A circuit is also established through the resistance 11 from the main 30 by way of conductors 55, 54 and thence either through the lower contacts 25ᵇ and switch contact 25 to the conductor 26 or if the switch block 25 is in raised position through the conductors 24, upper contacts 25ª and contact block 25, through the resistance 27 to the conductor 26, through winding 23 and conductor 59ᵇ to the conductor 59 which is connected directly to one terminal of the coil 9 and through the main switch contact 19 to the other main conductor 29. Thus the coil 9 and the resistance 11 are connected in parallel around the motor switch 44 but through the main switch contact 19. When the conductivity of the resistance 11 increases a larger current flows through coil 23 in the circuit above traced which raises the core 28 and the rod 32 until the switch arm 35 has snapped from its lower position to the upper dotted position, as shown in Fig. 1. This breaks the circuit through the motor switch coil 40 and between the contacts 25ᵇ but re-establishes the circuit of the resistance 11 through the upper contacts 25ª and the resistance 27, as previously traced. With the switch 39 closed, the current which will pass through ignition coil 9 is much greater than when the switch is open but the current which passes through the coil 42 is sufficient to hold the motor switch 44 closed. The dash pot 45 causes a slow closing of the switch 44 so that the ignition coil 9 has sufficient time to become thoroughly heated before the motor 1 is started and fuel is discharged into the furnace.

If there is no flow of current through the igniter 9, it is not in condition to ignite fuel, therefore it should not be possible to feed any fuel. This is actually the case because no current can flow through either of the windings 40 or 42 if the igniter coil is broken.

There is an element of time in connection with the change in resistance of the member 11, and while it is readily possible to start the motor and allow the fire to go out, and then immediately re-start the motor and feed fuel into the furnace, there is no means of igniting the fuel this soon, as it takes a short interval for the resistance 11 to cool sufficiently so that its resistance is increased, thereby allowing the magnet core 28 to drop and causing the switch contact lever 35 to return to its lower position closing the additional path by means of the contact 39 through the coil 40, resistance 41 and the igniter 11. This main circuit takes a comparatively large current, while the switch holding circuit including the coil 42 and resistance 43 takes a comparatively small current, barely enough to warm the igniter coil 9.

To avoid the possibility of this explosive condition in the furnace is the function of the latch 48 which prevents the re-engagement of contact block 19 of the main switch 16 with its contacts when attracted by the magnet 20. When the rod 32 and the core 28 drop raising the latch 48 and releasing the switch 16 it must first be attracted by the winding 20ª to place its upper end in contact with the contact 18 before the winding 20 can be energized to close the switch for the operating position.

When the resistance 11 is at comparatively low temperature its electrical resistance is very high and to cut out the main current through the igniter soon after the fuel is lighted, it is necessary that the coil 23 operates with the very slight current flow. The increase in temperature of the resistance member 11 increases its conductivity and increases the current flow through the coil 23 so that it is necessary to cut in the resistance 27 which is approximately equal to the resistance of the refractory member 11 at the time the iron core 28 is attracted into the solenoid, as all the remaining resistance of this member 11 will practically disappear when it reaches the maximum temperature in the flame of the furnace.

Thus it is seen that by having the motor, the coil 9 and the resistance 11 thus connected and controlled, the operation of the system is entirely automatic; the igniter and the varying resistance are first connected in parallel, allowing the igniter to receive a heavy flow of current before the motor is turned on to start the feeding of fuel; the contact of the fuel with the incandescent coil 9 ignites the fuel and this heats up the resistance 11; the heating of the resistance not only cuts out the major part of the current through the coil 9 but also protects the resistance 11. If the furnace is hot, the thermostatic device will throw out the main switch and stop the motor and the retarding device in connection with the latch 48 prevents the re-establishing of the motor circuit, either automatically or manually, until sufficient time is elapsed to allow the resistance 11 to become cool.

I claim:

1. The combination with a fuel feeding mechanism, of an electrical igniter, and an electrical resistance variable under different temperatures, the igniter and resistance being so connected that the main current will pass through the igniter if the resistance is cold and through the resistance if the resistance is hot.

2. The combination with a fuel feeding mechanism, of an electrical igniter, and an electrical resistance variable under different temperatures, the igniter and the resistance being connected in parallel so that the majority of the current will pass through the igniter if the resistance is cold and through the resistance if the resistance is hot.

3. The combination with a fuel feeding mechanism, of an electrical igniter, and an electrical resistance variable under different temperatures, the igniter and resistance being so connected that the current through the igniter is reduced as the conductivity of the resistance increases.

4. The combination with an electrically controlled fuel feeding mechanism, of an electrical igniter, and an electrical resistance under different temperatures and placed so that it is subject to the burning fuel, the resistance and the igniter being connected in parallel with each other and together in parallel with the fuel feeding mechanism.

5. The combination with a fuel feeding mechanism, of an electrical igniter, and an electrical conductor whose resistance varies under different temperatures, and means for varying the current flow through the igniter by the variation of resistance through the conductor.

6. The combination with a fuel feeding device, an electrical igniter, a variable electrical resistance for controlling the igniter exposed to the heat caused by the combustion of the fuel, said resistance having an air passage to quickly cool it when the fuel is not burning.

7. In an electrically controlled fuel feeding mechanism, a variable electrical resistance with an air passage to quickly cool the resistance when the fuel is not burning.

8. In an electrically controlled fuel feeding mechanism, a variable electrical resistance with an air passage to quickly cool the resistance when the fuel is not burning, and means for controlling the flow of air to said passage.

9. The combination with means for admitting fuel, of an igniter therefor, an electrical resistance so placed that it is electrically variable when the fuel is burning and not burning, an electrical means connected to said resistance for controlling the igniter which is operative by the temperature change of said resistance.

10. In an electrically controlled fuel feeding device, a variable electrical resistance subject to the heat of the fuel, the resistance having openings therethrough for cooling it when the fuel is not burning, and means dependent upon the electrical resistance for controlling the flow of air therethrough.

11. The combination with means for feeding a heavy or dense fuel, of a resistance that is electrically variable when such fuel is burning and not burning, of means for igniting the heavy or dense fuel, and means utilizing the variation of the said resistance for controlling the lighting means.

12. The combination with means for admitting fuel, of an electrical system for igniting the fuel independent of said means comprising a resistance of different conductivity when hot and cold, and altering in temperature by fuel burning and not burning, the igniter for said fuel having circuit connections, and means controlled by said resistance for disconnecting one igniter circuit but permitting a small electrical flow through the igniter.

13. The combination with means for admitting fuel, of an electrical system of igniting the same including electrical resistance variable when hot or cold and subject to the heat of the fuel, and means dependent upon said resistance for retarding the admission of fuel after said means is closed until the electrical resistance has cooled a predetermined amount.

14. In an electrically controlled fuel feeding system, a resistance variable when hot and cold, an electrical igniter, fuel feeding means, and means in connection with the resistance for reducing the current through the igniter and for preventing the actuation of the fuel feeding means until the resistance has cooled a predetermined amount.

15. The combination with means for admitting fuel, of an electrical igniting system comprising an electrical resistance member variable when hot and cold and subject to the influence of heat of the fuel, the range of control by the resistance being through comparatively low temperatures, and means for cutting in additional resistance in series with the electrical resistance to take the place of the drop in resistance of the heat actuated member when it reaches the higher temperatures.

16. The combination with a fuel feeding motor, of a fuel igniter, a variable resistance subject to heat of the fuel, means for connecting the igniter and resistance in parallel across the terminals of the motor, electrically operated means in series with the igniter for retarding the closure of a circuit through the motor until after the igniter is heated, and means depending upon the varying resistance for cutting off some of the current through the igniter when the resistance becomes hot.

17. In an electrically controlled fuel feeding system, an electrical igniter, heat control means for varying the current through the igniter and a signal device connected to the terminals of the igniter and variable to indicate the condition of the igniter.

18. In a fuel feeding system, a motor, a main switch and a motor switch, means for controlling the opening and closing of the main switch, an electrical igniter which receives current when the main switch is closed, and means in connection with the igniter for closing the motor switch after the igniter has received current.

19. In an electrical controlled fuel feeding system, a fuel feeding motor, a main switch, means for opening and closing the main switch, an electrical igniter, a motor switch, means in connection with the igniter for closing the motor switch after the main switch is closed, a variable electrical resistance subject to the action of heat, and means in connection with the resistance to prevent the closure of the main switch after it has been opened until said resistance has cooled a predetermined amount.

WILLIAM L. MORRIS.